US012688727B2

(12) United States Patent

Su et al.

(10) Patent No.: US 12,688,727 B2

(45) Date of Patent: Jul. 21, 2026

(54) DETECTION SYSTEM AND DETECTION METHOD

(71) Applicant: REALTEK SEMICONDUCTOR CORP., Hsinchu (TW)

(72) Inventors: Kai-Chun Su, Hsinchu (TW); Chao-Hsun Yang, Hsinchu (TW); Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 578 days.

(21) Appl. No.: 18/138,227

(22) Filed: Apr. 24, 2023

(65) Prior Publication Data

US 2024/0242535 A1      Jul. 18, 2024

(30) Foreign Application Priority Data

Jan. 18, 2023    (TW) ................................. 112102472

(51) Int. Cl.
| | |
|---|---|
| *G06V 40/16* | (2022.01) |
| *G06V 10/80* | (2022.01) |
| *G06V 10/82* | (2022.01) |

(52) U.S. Cl.
CPC .......... *G06V 40/165* (2022.01); *G06V 10/806* (2022.01); *G06V 10/82* (2022.01); *G06V 40/166* (2022.01); *G06V 40/171* (2022.01)

(58) Field of Classification Search
CPC .. G06V 10/806; G06V 40/165; G06V 40/166; G06V 40/171; G06V 10/454; G06V 10/82
See application file for complete search history.

(56) References Cited

U.S. PATENT DOCUMENTS

| | | | | |
|---|---|---|---|---|
| 2003/0235332 A1* | 12/2003 | Moustafa | ............ | G06F 18/2137 |
| | | | | 382/157 |
| 2014/0204193 A1* | 7/2014 | Zhang | .................... | G06V 40/18 |
| | | | | 348/78 |

(Continued)

FOREIGN PATENT DOCUMENTS

| | | | | |
|---|---|---|---|---|
| CN | 112989865 A | 6/2021 | | |
| CN | 115273143 A | * 11/2022 | .......... | G06V 10/764 |
| TW | 201118763 A1 | 6/2011 | | |

OTHER PUBLICATIONS

Deng et al., "RetinaFace: Single-stage Dense Face Localisation in the Wild", arXiv:1905.00641v2 [cs.CV], May 4, 2019, total 10 pages.

(Continued)

*Primary Examiner* — Gregory A Morse
*Assistant Examiner* — Stefano Anthony Dardano
(74) *Attorney, Agent, or Firm* — Birch, Stewart, Kolasch & Birch, LLP

(57) ABSTRACT

A detection system and a detection method are provided. The detection method includes: receiving an image containing a face by an angle acquisition module and obtaining a first angle and a second angle of the face based on the image; obtaining a first projection value and a second projection value based on the first angle and the second angle by a projection calculation module; and performing by a confidence calculation module: performing an exponentiation calculation on the first projection value based on a first correction value to obtain a third value; performing an exponentiation calculation on the second projection value based on a second correction value to obtain a fourth value; and obtaining a confidence value based on the third value and the fourth value.

14 Claims, 14 Drawing Sheets

(56) References Cited

U.S. PATENT DOCUMENTS

| 2018/0204097 | A1* | 7/2018 | Karki | G06T 5/50 |
| 2022/0292878 | A1 | 9/2022 | Wang et al. | |
| 2024/0203160 | A1* | 6/2024 | Lee | G06V 40/172 |
| 2025/0182526 | A1* | 6/2025 | Wang | G06V 10/82 |

OTHER PUBLICATIONS

Valle et al., "Multi-task head pose estimation in-the-wild", Journal of Latex Class Files, vol. 14, No. 8, Aug. 2015, pp. 1-8.

Yang et al., "FSA-Net: Learning Fine-Grained Structure Aggregation for Head Pose Estimation from a Single Image", 2019 IEEE/CVF Conference on Computer Vision and Pattern Recognition (CVPR), Jun. 2019, total 10 pages.

Zhu et al., "TinaFace: Strong but Simple Baseline for Face Detection", arXiv:2011.13183v3 [cs.CV], Jan. 22, 2021, pp. 1-9.

* cited by examiner

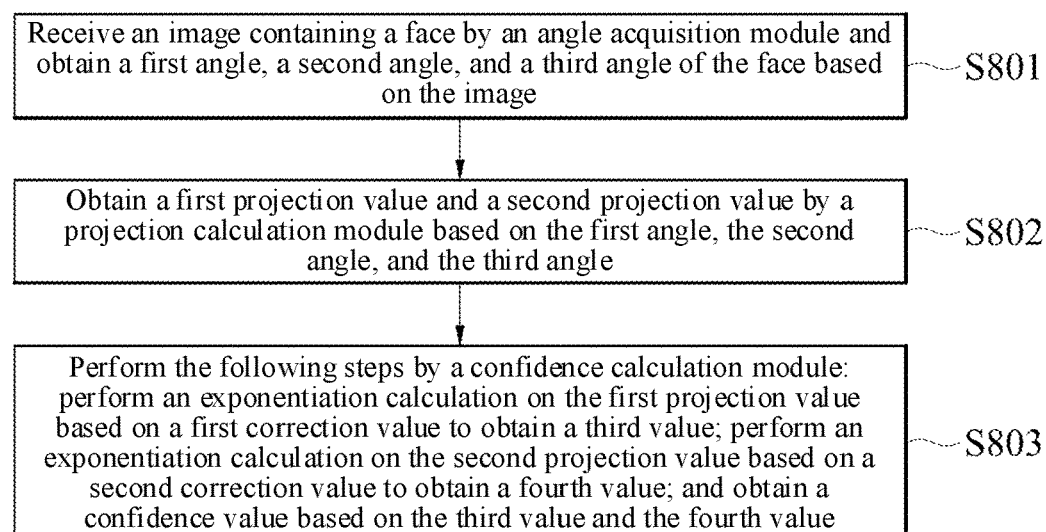

Receive an image containing a face by an angle acquisition module and obtain a first angle, a second angle, and a third angle of the face based on the image ~~S801

Obtain a first projection value and a second projection value by a projection calculation module based on the first angle, the second angle, and the third angle ~~S802

Perform the following steps by a confidence calculation module: perform an exponentiation calculation on the first projection value based on a first correction value to obtain a third value; perform an exponentiation calculation on the second projection value based on a second correction value to obtain a fourth value; and obtain a confidence value based on the third value and the fourth value ~~S803

FIG. 8

Calculate a difference value between 1 and a square root of a sum of a third value and a fourth value to obtain a confidence value ~~S901

FIG. 9

Receive an image containing a face and output a first angle, a second angle, and a third angle of the face by a neural network module ~~S1001

FIG. 10

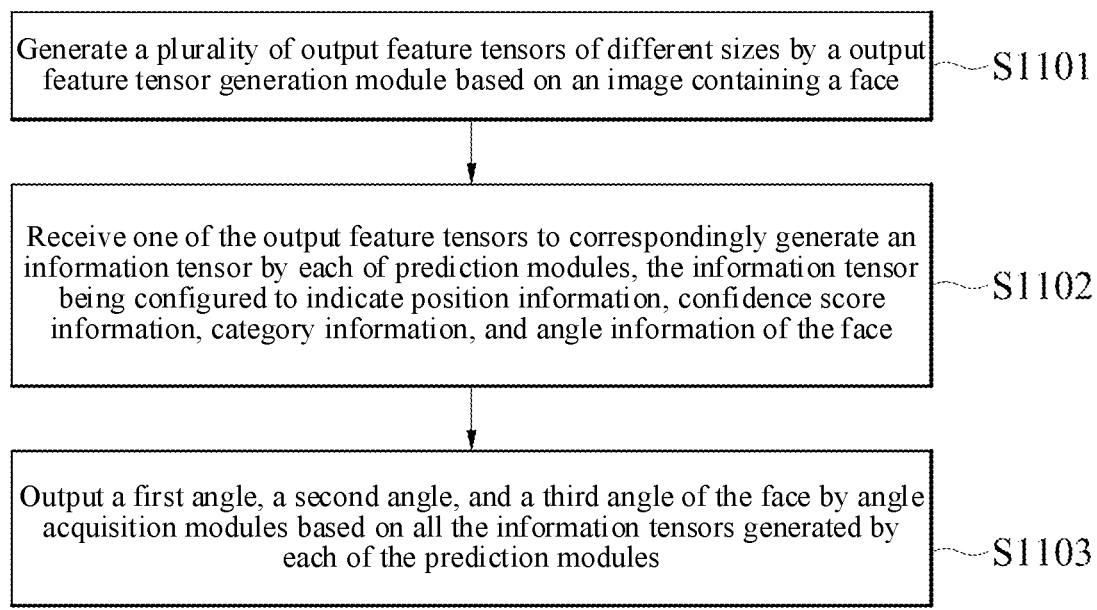

Generate a plurality of output feature tensors of different sizes by a output feature tensor generation module based on an image containing a face ~~S1101

Receive one of the output feature tensors to correspondingly generate an information tensor by each of prediction modules, the information tensor being configured to indicate position information, confidence score information, category information, and angle information of the face ~~S1102

Output a first angle, a second angle, and a third angle of the face by angle acquisition modules based on all the information tensors generated by each of the prediction modules ~~S1103

FIG. 11

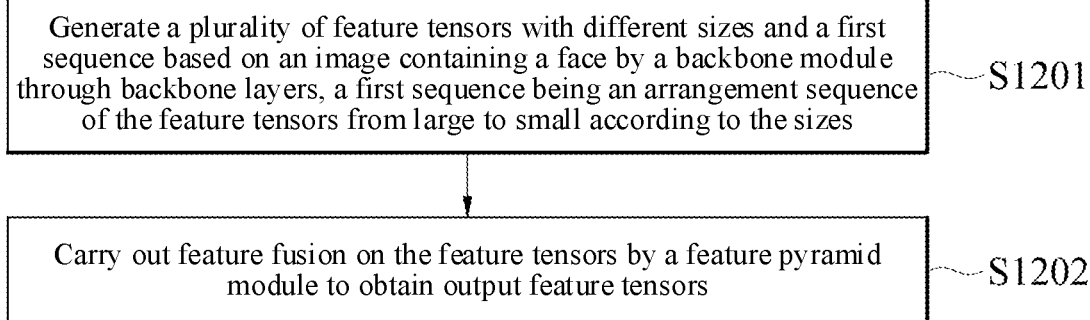

Generate a plurality of feature tensors with different sizes and a first sequence based on an image containing a face by a backbone module through backbone layers, a first sequence being an arrangement sequence of the feature tensors from large to small according to the sizes ~~S1201

Carry out feature fusion on the feature tensors by a feature pyramid module to obtain output feature tensors ~~S1202

FIG. 12

DETECTION SYSTEM AND DETECTION METHOD

CROSS-REFERENCE TO RELATED APPLICATION

This non-provisional application claims priority under 35 U.S.C. § 119(a) to Patent Application No. 112102472 filed in Taiwan, R.O.C. on Jan. 18, 2023, the entire contents of which are hereby incorporated by reference.

BACKGROUND

Technical Field

The present disclosure relates to the field of image identification, and particularly to a technology for determining a state of a human face in an image by applying a plurality of angles of the human face in the image.

Related Art

For face recognition, the front face is an important data for face recognition compared with the side face. In known traditional technologies, the pupil distance of human eyes in a human face is a common index for front face evaluation, but this index does not take the distance problem in human face detection into account. The pupil distance of the distant front face may be the same as that of the close side face, so it is still unable to correctly select a front face sample for human face recognition according to the pupil distance of human eyes.

SUMMARY

In view of this, some embodiments of the present disclosure provide a detection system and a detection method to reduce the existing technical problems.

Some embodiments of the present disclosure provide a detection system. The detection system includes an angle acquisition module, a projection calculation module and a confidence calculation module; the angle acquisition module is configured to receive an image containing a face, and obtain a first angle and a second angle of the face based on the image; the projection calculation module is configured to obtain a first projection value and a second projection value based on the first angle, the second angle and the third angle; the confidence calculation module is configured to perform the following steps: performing an exponentiation calculation on the first projection value based on a first correction value to obtain a third value; performing an exponentiation calculation on the second projection value based on a second correction value to obtain a fourth value; and obtaining a confidence value based on the third value and the fourth value.

Some embodiments of the present disclosure provide a detection method, which is applicable to a detection system including an angle acquisition module, a projection calculation module and a confidence calculation module. The detection method includes the following steps of receiving an image containing a face by the angle acquisition module and obtaining a first angle and a second angle of the face based on the image; obtaining a first projection value and a second projection value by the projection calculation module based on the first angle, the second angle and the third angle; and performing by the confidence calculation module: performing an exponentiation calculation on the first projection value based on a first correction value to obtain a third value; performing an exponentiation calculation on the second projection value based on a second correction value to obtain a fourth value; and obtaining a confidence value based on the third value and the fourth value.

Based on the above, the detection system and the detection method provided by some embodiments of the present disclosure can quickly obtain the confidence value of the detected face as the front face by performing simple algebraic operation on the first angle and the second angle of the detected face.

BRIEF DESCRIPTION OF THE DRAWINGS

FIG. 2-1 is a face angle schematic diagram according to some embodiments of the present disclosure.

FIG. 2-2 is a face pitch angle schematic diagram according to some embodiments of the present disclosure.

FIG. 2-3 is a face roll angle schematic diagram according to some embodiments of the present disclosure.

FIG. 2-4 is a face yaw angle schematic diagram according to some embodiments of the present disclosure.

FIG. 3 is a neural network module block diagram according to some embodiments of the present disclosure.

FIG. 4-1 is an output feature tensor generation module block diagram according to some embodiments of the present disclosure.

FIG. 4-2 is an output feature tensor generation module block diagram according to some embodiments of the present disclosure.

FIG. 6-1 is a prediction module schematic structural diagram according to some embodiments of the present disclosure.

FIG. 6-2 is an information tensor schematic structural diagram according to some embodiments of the present disclosure.

FIG. 8 is a detection method flowchart according to some embodiments of the present disclosure.

FIG. 9 is a detection method flowchart according to some embodiments of the present disclosure.

FIG. 10 is a detection method flowchart according to some embodiments of the present disclosure.

FIG. 11 is a detection method flowchart according to some embodiments of the present disclosure.

FIG. 12 is a detection method flowchart according to some embodiments of the present disclosure.

DETAILED DESCRIPTION

The aforementioned and other technical contents, features and functions of the present disclosure will be clearly presented in the following detailed description of the embodiments in conjunction with the accompanying drawings. The thickness or size of each element in the figures is expressed in an exaggerated, omitted or approximate way for those familiar with the art to understand and read, and the size of each element is not entirely its actual size, and is not used to limit the implementation of the present disclosure, so it has no technical significance. Any modification of structure, change of proportion or adjustment of size, without affecting the efficacy and purpose of the present disclosure, shall still fall within the scope of the technical content disclosed in the present disclosure. The same label in all diagrams will be used to represent the same or similar components. The term "connection" mentioned in the following embodiments can refer to any direct or indirect, wired or wireless connection means. Herein, the "first" or "second" and other similar ordinal words described are used to distinguish or refer to the same or similar elements or structures, and do not necessarily imply the order of these elements in the system. It is to be understood that in some cases or configurations, ordinal words can be used interchangeably without affecting the implementation of the present disclosure.

Figure 1:
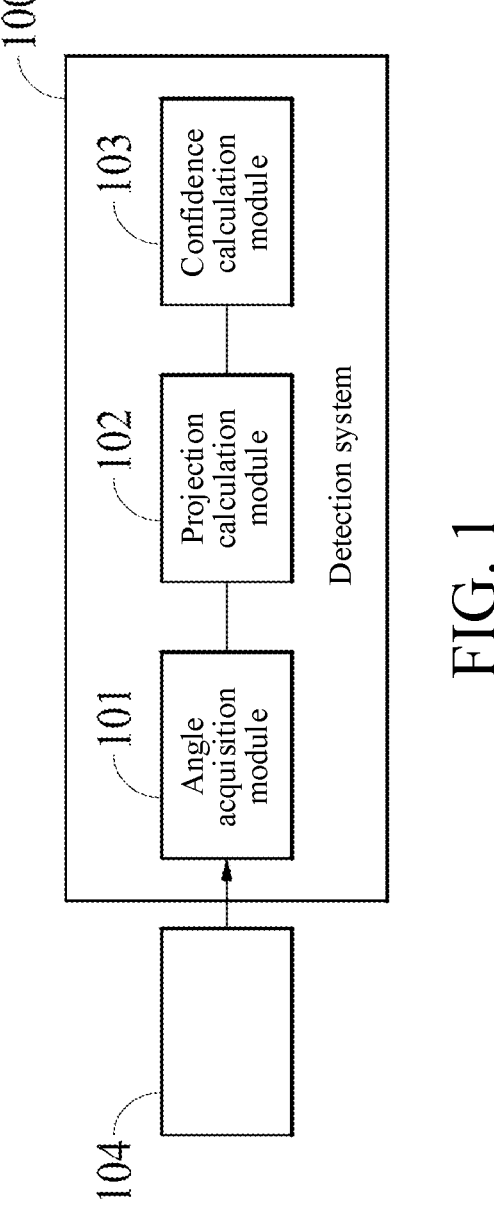
FIG. 1 is a detection system block diagram according to some embodiments of the present disclosure.

FIG. 1 is a detection system block diagram according to some embodiments of the present disclosure. As shown in FIG. 1, a detection system 100 includes an angle acquisition module 101, a projection calculation module 102 and a confidence calculation module 103. The angle acquisition module 101 is configured to receive an image 104 containing a face and obtain a first angle, a second angle and a third angle of the face based on the image 104.

Figures 1, 2:
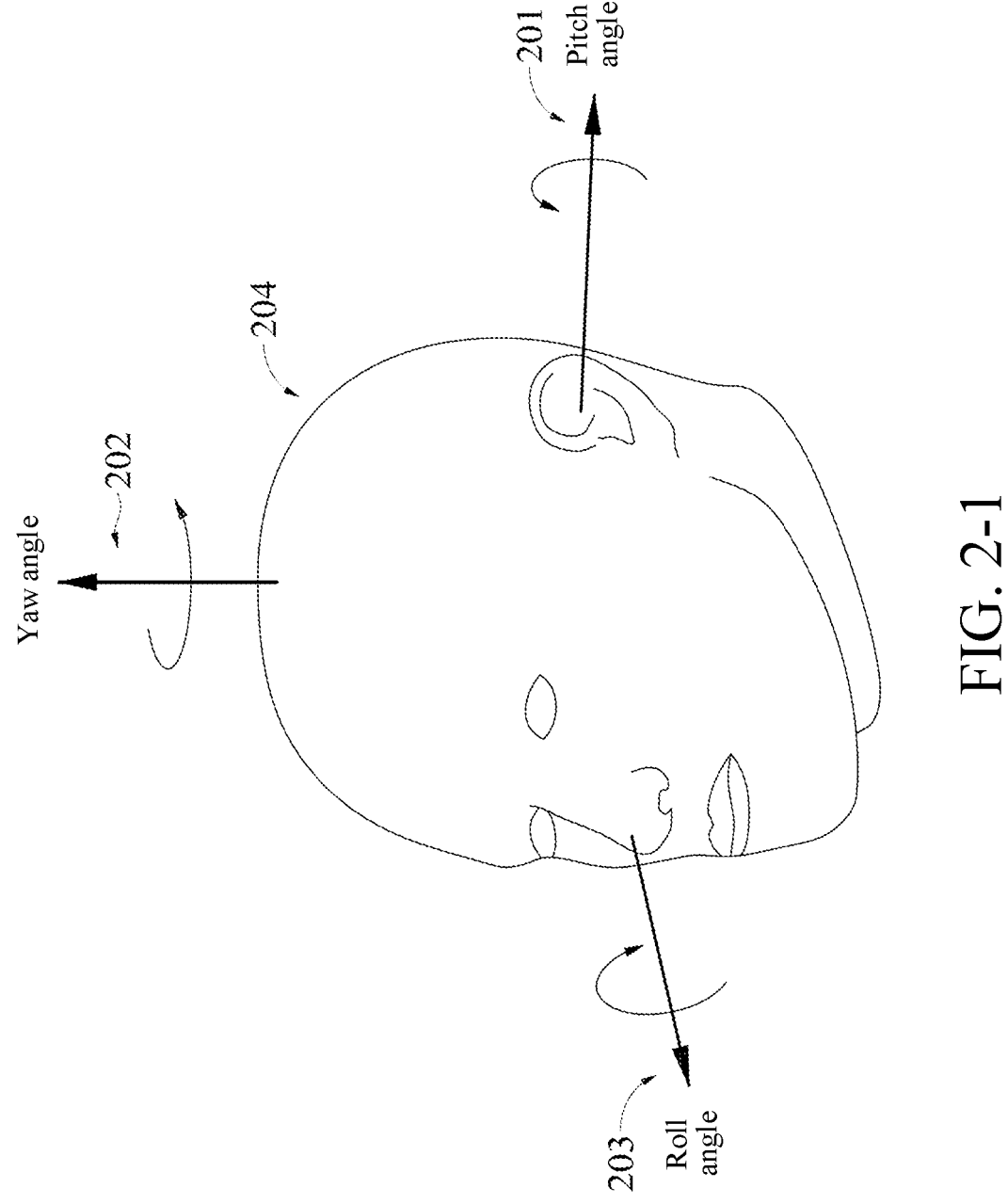
Figure 2:
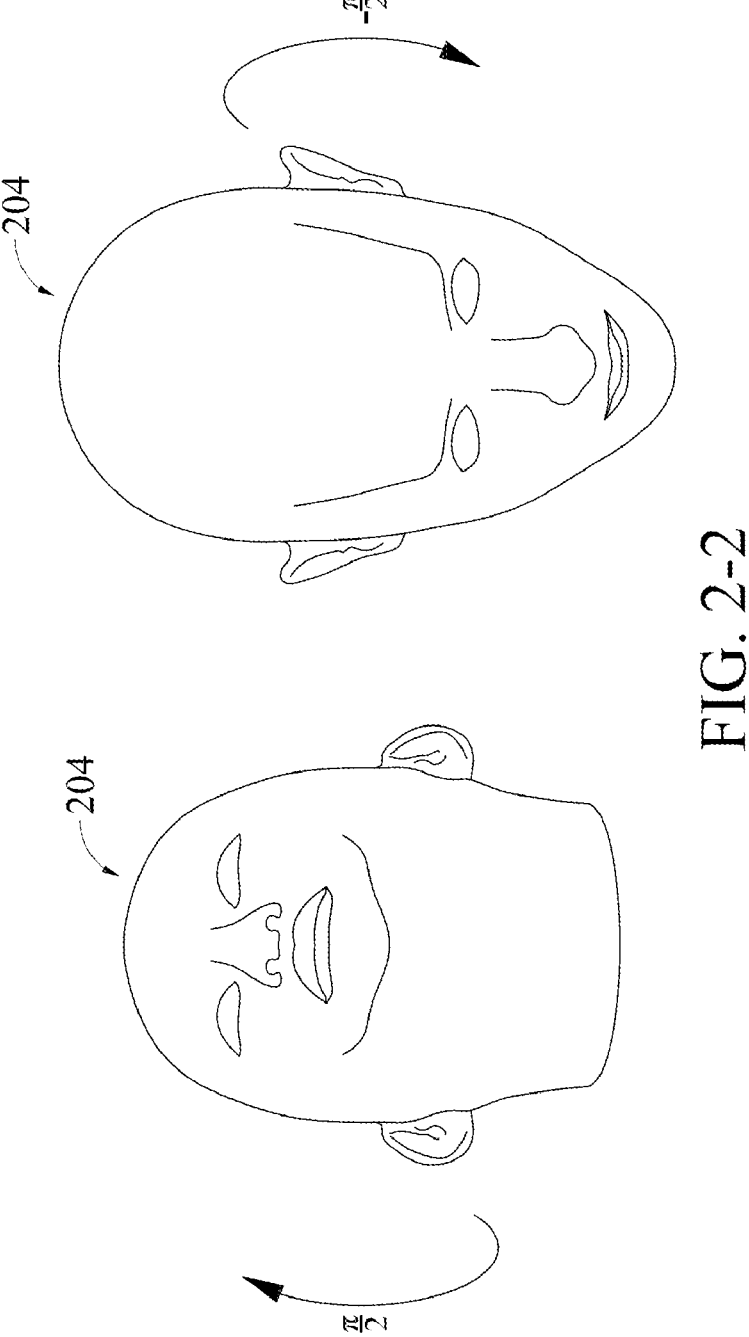
Figures 2, 3:
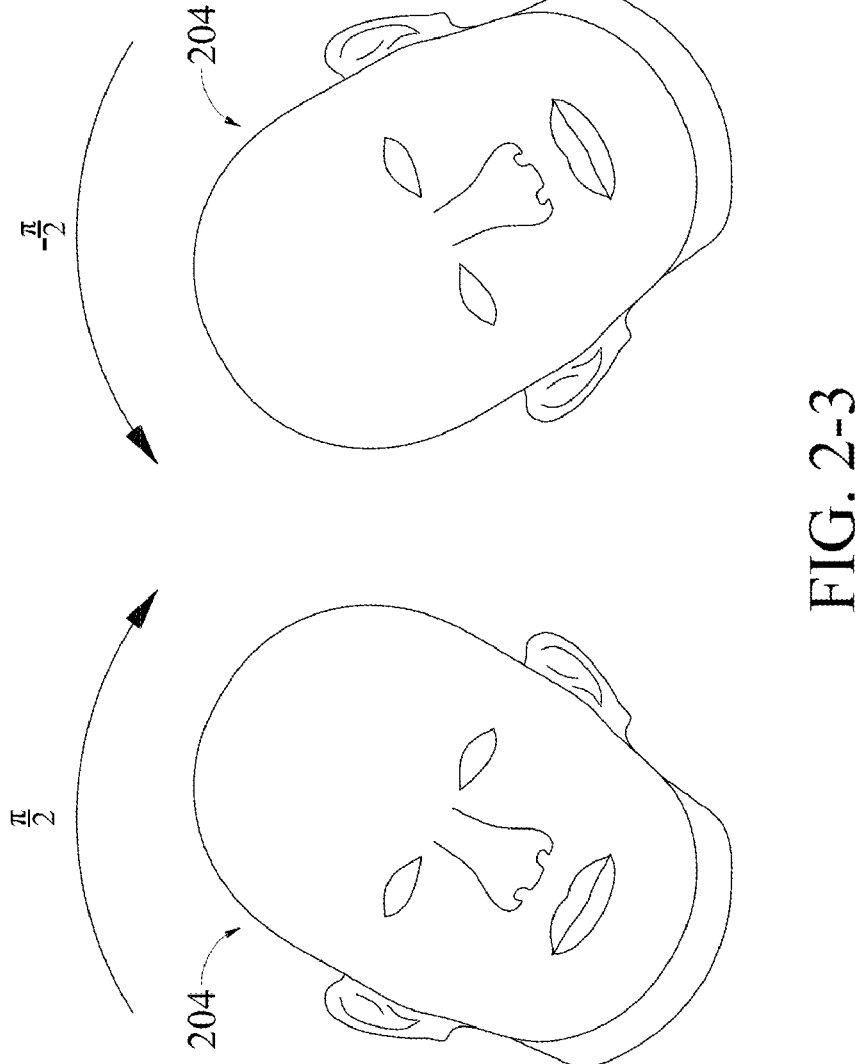
Figures 2, 3, 4:
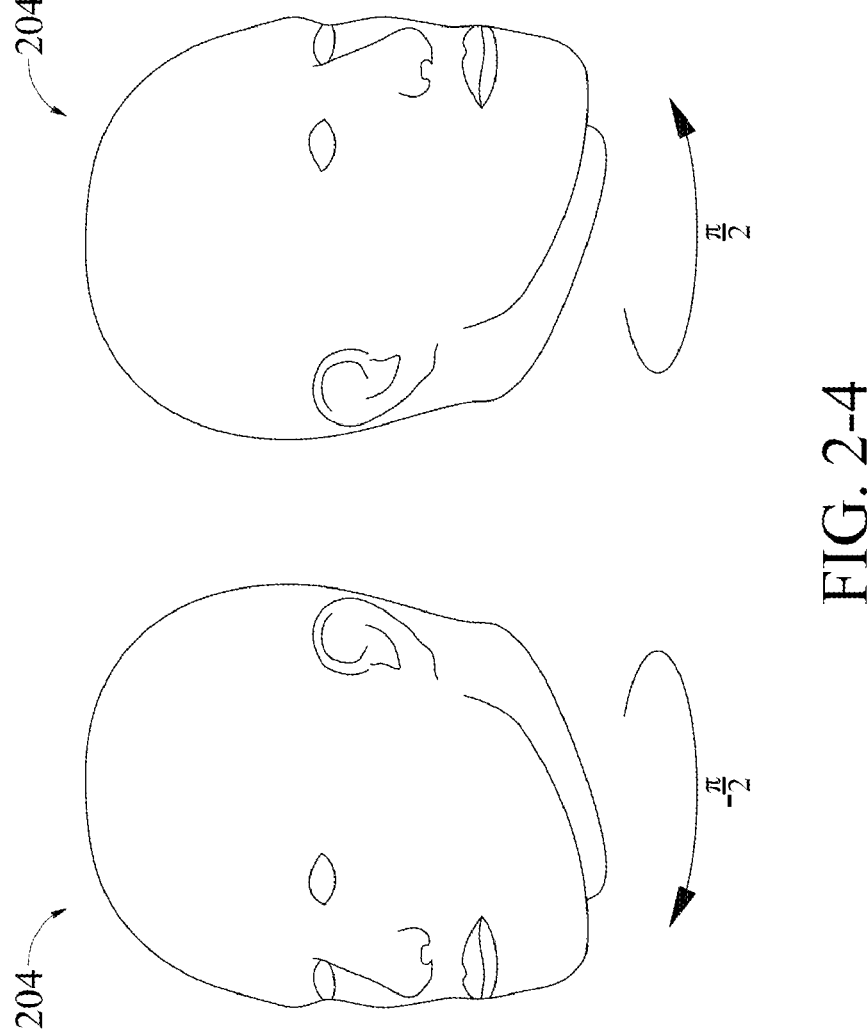
Figure 3:
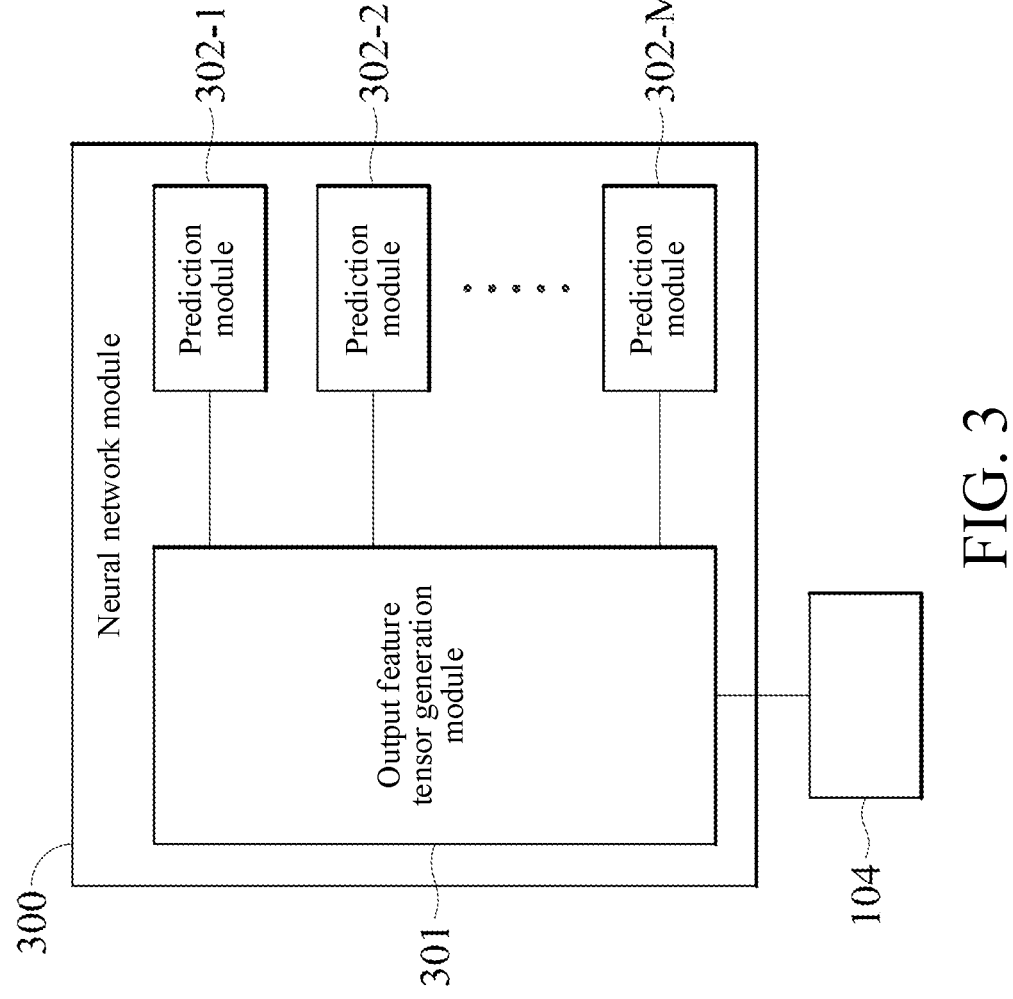
Figures 1, 4:
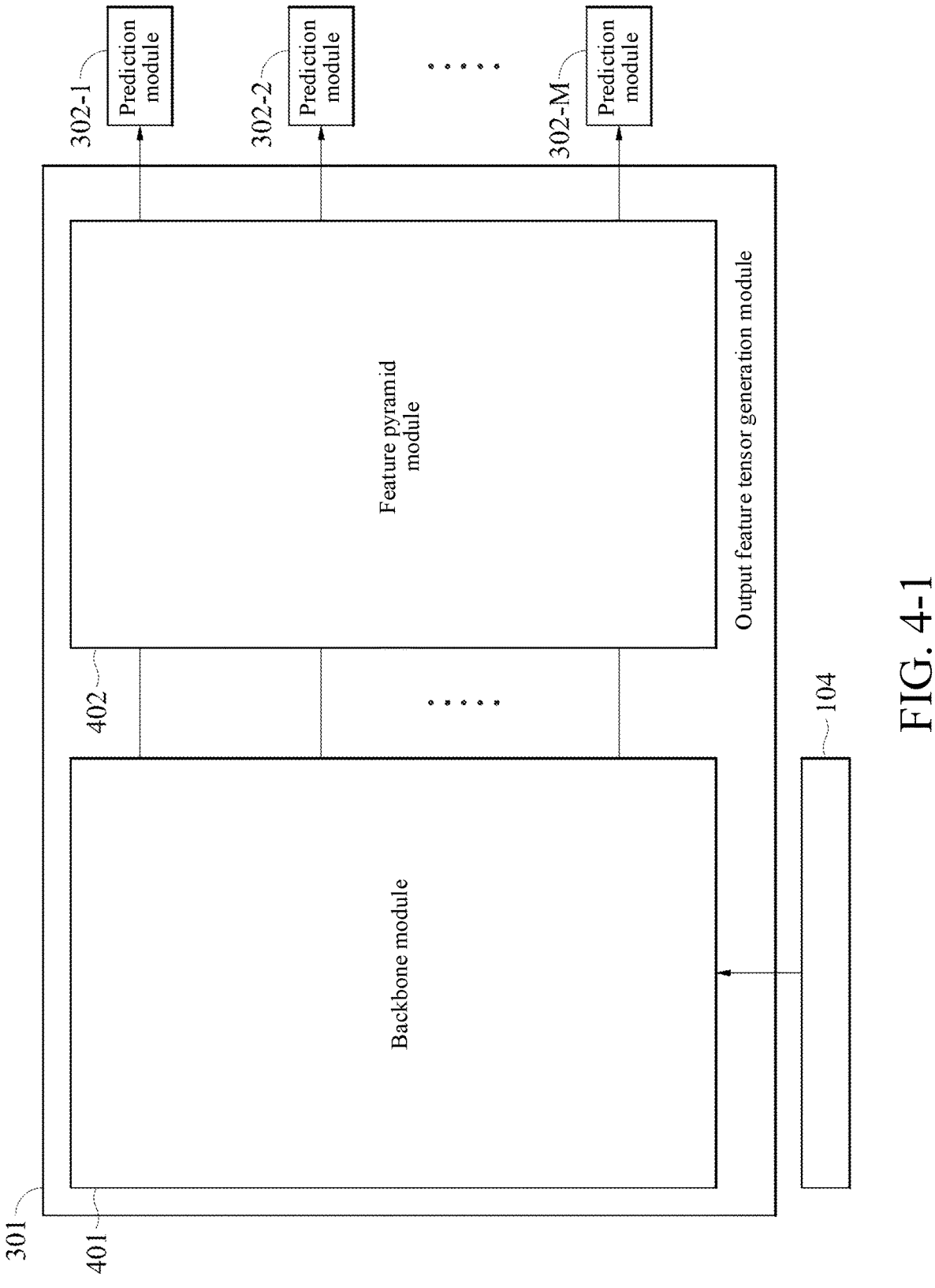
Figures 2, 4:
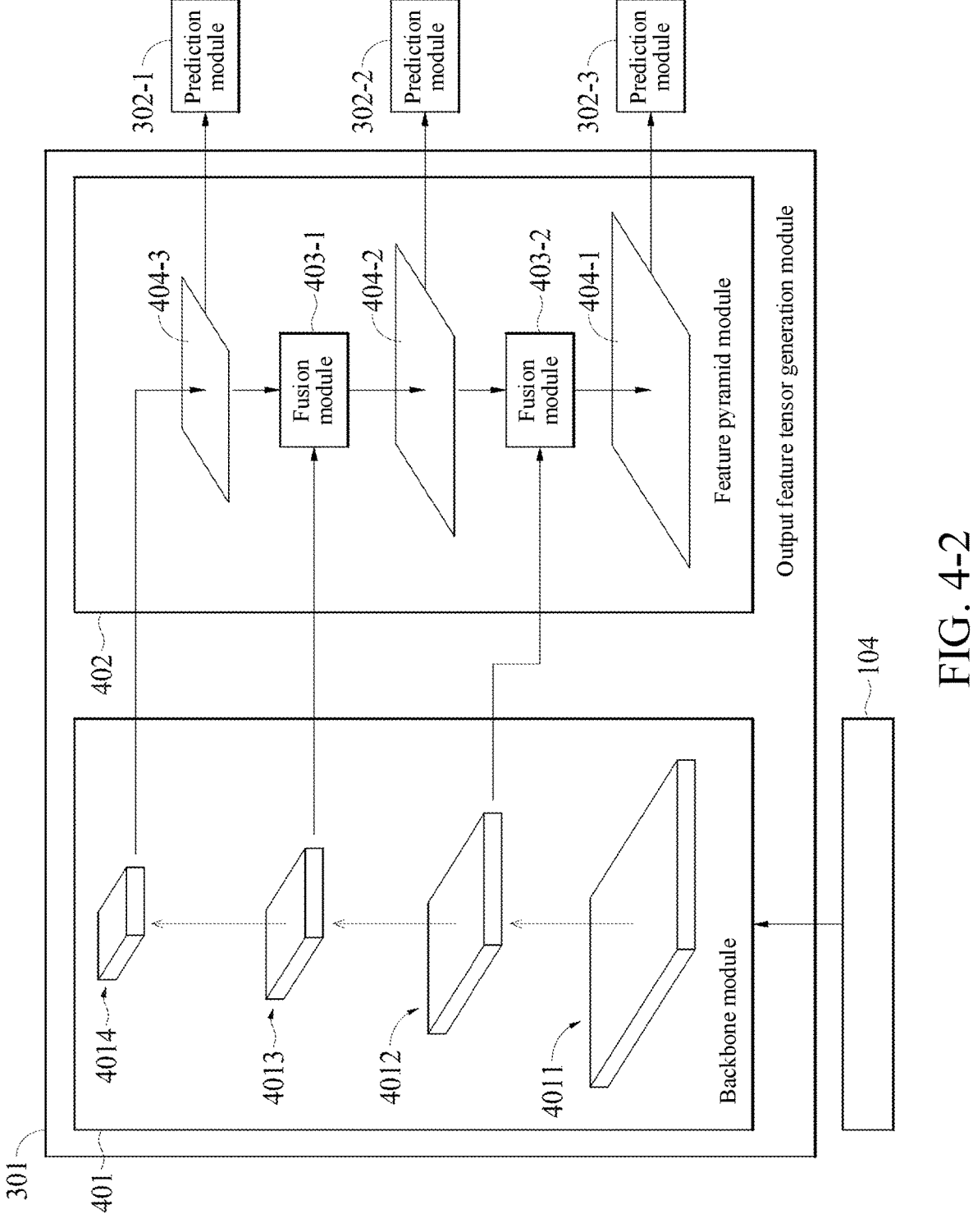

FIG. 2-1 is a face angle schematic diagram according to some embodiments of the present disclosure. FIG. 2-2 is a face pitch angle schematic diagram according to some embodiments of the present disclosure. FIG. 2-3 is a face yaw angle schematic diagram according to some embodiments of the present disclosure. FIG. 2-4 is a face yaw angle schematic diagram according to some embodiments of the present disclosure. Refer to FIG. 2-1 to FIG. 2-4 together, in some embodiments of the present disclosure, an angle at which a head 204 corresponding to the face in the image 104 rotates relative to an x-axis 201 is defined as a pitch angle of the face in the image 104. An angle at which the head 204 corresponding to the face in the image 104 rotates relative to a y-axis 202 is defined as a yaw angle of the face in the image 104. An angle at which the head 204 corresponding to the face in the image 104 rotates relative to a z-axis 203 is defined as a roll angle of the face in the image 104. When the head 204 is in a state that the face directly faces a camera lens, the pitch angle, the yaw angle and the roll angle of the face in the image 104 are 0 degree.

As shown in FIG. 2-2 to FIG. 2-4, the pitch angle, the yaw angle and the roll angle of the face in the image 104 are all in a range of −90° to 90°. In some embodiments of the present disclosure, in order to facilitate processing in a computer, the pitch angle, the yaw angle and the roll angle of the face are all represented by radians. That is, the pitch angle, the yaw angle and the roll angle of the face in the image 104 are all in a range of $$\left[ -\frac{\pi}{2}, \frac{\pi}{2} \right].$$

In some embodiments of the present disclosure, the first angle of the face is the yaw angle of the face, the second angle of the face is the pitch angle of the face, and the third angle of the face is the roll angle of the face.

The detection method and cooperative operation of the modules of the detection system 100 of some embodiments of the present disclosure are described below in detail in cooperation with the drawings.

FIG. 8 is a detection method flowchart according to some embodiments of the present disclosure. Refer to FIG. 1, FIG. 2-1 to FIG. 2-4 and FIG. 8 together, in the embodiments as shown in FIG. 8, the first angle of the face is the yaw angle of the face, the second angle of the face is the pitch angle of the face, and the third angle of the face is the roll angle of the face. The detection method includes steps S801 to S803. In step S801, the angle acquisition module 101 receives the image 104 containing the face, and obtains the first angle, the second angle, and the third angle of the face based on the image 104. In step S802, the projection calculation module 102 obtains a first projection value and a second projection value based on the first angle, the second angle, and the third angle.

In step S803, the confidence calculation module 103 performs the following programs: performing an exponentiation calculation on the first projection value based on a first correction value to obtain a third value; performing an exponentiation calculation on the second projection value based on a second correction value to obtain a fourth value; and obtaining a confidence value based on the third value and the fourth value. Let x represent the first projection value, y represent the second projection value, x' represent the third value, y' represent the fourth value, γ represent the first correction value, and δ represent the second correction value, then the programs can be represented by the following equation:

$$x' = x^{\gamma}, \tag{1}$$

$$y' = y^{\delta}.$$

In some embodiments of the present disclosure, step S802 includes: setting the first projection value as a sine function value of the first angle, and setting the second projection value as a negative number obtained by multiplying the cosine function value of the first angle by the sine function value of the second angle. The operation can be represented by the following equation:

$$x = \sin(yaw), \tag{2}$$

$$y = -\cos(yaw) \cdot \sin(pitch).$$

where yaw represents the first angle (the yaw angle of the face in this embodiment) of the face in the image 104, pitch represents the second angle (the pitch angle of the face in this embodiment) of the face in the image 104, x represents the first projection value, and y represents the second projection value.

In some embodiments of the present disclosure, the first correction value in step S803 is obtained by multiplying a first preset parameter by 2, and the second correction value is obtained by multiplying a second preset parameter by 2. Let α represent the first preset parameter, β represent the second preset parameter, then the first correction value γ can be represented as γ=2α, the second correction value δ can be represented as δ=2β, and the third value x' and the fourth value y' can be represented by the following equation:

$$x' = x^{2\alpha}, \tag{3}$$

$$y' = y^{2\beta}.$$

where x represents the first projection value, and y represents the second projection value. In some embodiments of the present disclosure, the first preset parameter α and the second preset parameter β are parameters received from the outside, and the ranges of the two parameters both are [0, ∞). A user can adjust the values of the first preset parameter α and the second preset parameter β according to experience or needs so as to adjust the proportion of the first projection value and the second projection value in confidence calculation. When the first preset parameter α is set to be [0,1), the proportion of the first projection value x in confidence calculation is substantially reduced; and when the first preset parameter α is set to be (1, ∞), the proportion of the first projection value x in confidence calculation is substantially increased. Similarly, when the second preset parameter β is set to be [0,1), the proportion of the second projection value y in confidence calculation is substantially reduced, and when the second preset parameter β is set to be (1, ∞), the proportion of the second projection value y in confidence calculation is substantially increased.

FIG. 9 is a detection method flowchart according to some embodiments of the present disclosure. In the embodiments as shown in FIG. 9, step S803 includes step S901. In step S901, the confidence calculation module 103 calculates a difference value between 1 and a square root of a sum of the third value x' and the fourth value y' to obtain a confidence value. Let ffc represent the confidence value, then the calculation of the confidence value ffc can be represented by the following equation:

$$ffc = 1 - \sqrt[2]{x' + y'}. \qquad (4)$$

In some embodiments of the present disclosure, the first preset parameter α is set to be 1, the second preset parameter β is set to be 1, in this case, the range of the ffc is in a [0,1] interval, and a larger confidence value ffc represents that the confidence value that the face in the image 104 directly faces a camera is higher.

FIG. 3 is a neural network module block diagram according to some embodiments of the present disclosure. FIG. 10 is a detection method flowchart according to some embodiments of the present disclosure. Refer to FIG. 1, FIG. 2-1 to FIG. 2-4, FIG. 3 and FIG. 10 together, in some embodiments of the present disclosure, the angle acquisition module 101 includes a neural network module 300. The neural network module 300 is configured to receive the image 104 containing the face and output the first angle, the second angle and the third angle of the face. The step S801 includes step S1001. In step S1001, the neural network module 300 receives the image 104 containing the face and outputs the first angle, the second angle and the third angle of the face.

Various implementations of the neural network module 300 are further described below. In some embodiments of the present disclosure, the neural network module 300 includes an output feature tensor generation module 301 and a prediction module 302-1 to a prediction module 302-M, where M is a positive integer greater than or equal to 2. The output feature tensor generation module 301 is configured to generate a plurality of output feature tensors of different sizes based on the image 104 containing the face. Each of the prediction modules 302-1 to 302-M is configured to receive one of the output feature tensors to correspondingly generate an information tensor. That is, each of the prediction modules 302-1 to 302-M will generate one information tensor. The information tensor is configured to indicate position information, confidence score information, category information and angle information of the face. The angle acquisition module 101 is configured to output the first angle, the second angle and the third angle of the face based on all the information tensors generated by each of the prediction modules 302-1 to 302-M.

FIG. 11 is a detection method flowchart according to some embodiments of the present disclosure. As shown in FIG. 11, in the embodiment as shown in FIG. 11, step S1001 includes steps S1101 to S1103. In step S1101, the output feature tensor generation module 301 generates the plurality of output feature tensors of different sizes based on the image 104 containing the face. In step S1102, each of the prediction modules 302-1 to 302-M receives one of the plurality of output feature tensors to correspondingly generate one information tensor. As previously mentioned, the information tensor indicates the position information, the confidence score information, the category information and the angle information of the face. In step S1103, the angle acquisition module 101 outputs the first angle, the second angle and the third angle of the face based on all the information tensors generated by each of the prediction modules 302-1 to 302-M.

FIG. 4-1 is an output feature tensor generation module block diagram according to some embodiments of the present disclosure. FIG. 4-2 is an output feature tensor generation module block diagram according to some embodiments of the present disclosure. Refer to FIG. 3, FIG. 4-1 and FIG. 4-2 together, for convenience, M=3 is utilized to illustrate as follows. The output feature tensor generation module 301 includes a backbone module 401 and a feature pyramid module 402. The image 104 containing the face is, for example, a tensor having a dimension of 256×256×3 or a tensor having a dimension of 256×256×1.

In some embodiments of the present disclosure, the backbone module 401 includes backbone layers 4011 to 4014 with different sizes. The backbone module 401 is configured to generate a plurality of feature tensors with different sizes and a first sequence based on the image 104 containing the face through the backbone layers 4011 to 4014. As shown in FIG. 4-2, the plurality of feature tensors are an output tensor of the backbone layer 4012, an output tensor of the backbone layer 4013 and an output tensor of the backbone layer 4014. The first sequence is an arrangement sequence of the feature tensors from large to small according to the sizes. It is to be noted that although the backbone module 401 in this embodiment only includes 4 backbone layers, a person of ordinary skill can use other numbers of backbone layers according to requirements in the technical field. This is not limited in the present disclosure. In addition, it is to be noted that, although the backbone layers 4011 to 4014 are connected in series in the embodiment as shown in FIG. 4-2, the backbone layers 4011 to 4014 may also be connected in series and in parallel at the same time. This is not limited in the present disclosure. The feature pyramid module 402 is configured to carry out feature fusion on the feature tensors to obtain a plurality of output feature tensors.

FIG. 12 is a detection method flowchart according to some embodiments of the present disclosure. Refer to FIG. 3, FIG. 4-1, FIG. 4-2 and FIG. 12, in the embodiment as shown in FIG. 12, step S1101 includes step S1201 and step S1202. In step S1201, the backbone module 401 generates the plurality of feature tensors with different sizes and the first sequence based on the image 104 of the face through the backbone layers 4011 to 4014. The first sequence is the arrangement sequence of the feature tensors from large to small according to the sizes. In step S1202, the feature pyramid module 402 performs feature fusion on the feature tensors with different sizes and the first sequence generated by the backbone module 401 based on the image 104 of the face through the backbone layers 4011 to 4014 so as to obtain the output feature tensor.

In some embodiments of the present disclosure, the backbone layer 4011 is configured to include a convolution layer, and the convolution layer of the backbone layer 4011 receives the image 104 containing the face and performs a convolution operation on the image 104 containing the face to output an output tensor having a dimension of 32×32× 256. The backbone layer 4012 is configured to include a convolution layer, and the convolution layer of the backbone layer 4012 receives the output tensor of the convolution layer of the backbone layer 4011 and performs the convolution operation on the output tensor of the convolution layer of the backbone layer 4011 to output an output tensor having a dimension of 16×16×256; the backbone layer 4013 is configured to include a convolution layer, and the convolution layer of the backbone layer 4013 receives the output tensor of the convolution layer of the backbone layer 4012 and performs a convolution operation on the output tensor of the convolution layer of the backbone layer 4012 to output an output tensor having a dimension of 8×8×256; and the backbone layer 4014 is configured to include a convolution layer, and the convolution layer of the backbone layer 4014 receives the output tensor of the convolution layer of the backbone layer 4013 and performs a convolution operation on the output tensor of the convolution layer of the backbone layer 4013 to output an output tensor having a dimension of 4×4×256. The output tensors of the backbone layer 4014, the backbone layer 4013 and the backbone layer 4012 are used as the plurality of feature tensors. The first sequence is as follows: the output tensor of the convolution layer of the backbone layer 4011, the output tensor of the convolution layer of the backbone layer 4012, the output tensor of the convolution layer of the backbone layer 4013 and the output tensor of the convolution layer of the backbone layer 4014. Thus, the first sequence is the arrangement sequence of the feature tensors according to the size from large to small.

As shown in FIG. 4-2, in some embodiments of the present disclosure, the feature pyramid module 402 includes a fusion module 403-1 and a fusion module 403-2. The feature pyramid module 402 is configured to execute the following steps to perform feature fusion on the feature tensors so as to obtain the plurality of output feature tensors.

First, the feature pyramid module 402 sets the last minimum feature tensor corresponding to the first sequence as one in a temporary feature tensor set; and by taking the embodiment as shown in FIG. 4-2 as an example, the minimum feature tensor is the output tensor of the backbone layer 4014 and is stored in a temporary feature tensor 404-3 to serve as one in the temporary feature tensor set.

Then, the feature pyramid module 402 performs upsampling operation on the temporary feature tensor 404-3 through the fusion module 403-1 to obtain an upsampled temporary feature tensor 404-3 with the same size as the output tensor of the backbone layer 4013; the feature pyramid module 402 then performs feature fusion on the upsampled temporary feature tensor 404-3 and the output tensor of the backbone layer 4013 through the fusion module 403-1 to obtain a temporary feature tensor 404-2 with the same size as the output tensor of the convolution layer of the backbone layer 4013. The feature pyramid module 402 then performs upsampling operation on the temporary feature tensor 404-2 to obtain an upsampled temporary feature tensor 404-2 with the same size as the output tensor of the convolution layer of the backbone layer 4012; and the feature pyramid module 402 then performs feature fusion on the upsampled temporary feature tensor 404-2 and the output tensor of the convolution layer of the backbone layer 4012 through the fusion module 403-2 to obtain a temporary feature tensor 404-1 with the same size as the output tensor of the convolution layer of the backbone layer 4012.

The feature pyramid module 402 outputs the temporary feature tensor 404-3, the temporary feature tensor 404-2 and the temporary feature tensor 404-1 as the plurality of output feature tensors of the feature pyramid module 402. It is to be noted that in the aforementioned embodiment, 3 output feature tensors of different sizes are generated as examples for illustrating. In the technical field of the present disclosure, a person of ordinary skill can increase the number of backbone layers in the backbone module 401 and the number of fusion modules in the feature pyramid module 402 freely according to the aforementioned description to obtain any number of output feature tensors of different sizes. The present disclosure is not limited to the generation of 3 output feature tensors of different sizes.

According to the above-mentioned embodiments, the backbone layer 4014 outputs a feature tensor having a dimension of 4×4×256; the backbone layer 4013 outputs a feature tensor having a dimension of 8×8×256; and a backbone layer 4012 outputs a feature tensor having a dimension of 16×16×256. It is illustrated based on the first sequence of the feature tensor output by the backbone layer 4012, the feature tensor output by the backbone layer 4013 and the feature tensor output by the backbone layer 4014. Because the last minimum feature tensor corresponding to the first sequence is the feature tensor having the dimension of 4×4×256 output by the backbone layer 4014, in the aforementioned steps, the feature tensor having the dimension of 4×4×256 output by the backbone layer 4014 (the size is 8 in this case) is set as the minimum feature tensor and stored in the temporary feature tensor 404-3 to serve as one in a temporary feature tensor set.

Then, the feature pyramid module 402 performs upsampling operation on the temporary feature tensor 404-3 through the fusion module 403-1 to obtain an upsampled temporary feature tensor 404-3 with the same size as the output tensor of the convolution layer of the backbone layer 4013; the feature pyramid module 402 then performs feature fusion on the upsampled temporary feature tensor 404-3 and the output tensor of the backbone layer 4013 through the fusion module 403-1 to obtain the temporary feature tensor 404-2 (the dimension is 8×8×256, and the size is 8) with the same size as the output tensor of the backbone layer 4013. The feature pyramid module 402 then performs upsampling operation on the temporary feature tensor 404-2 to obtain the upsampled temporary feature tensor 404-2 with the same size as the output tensor of the convolution layer of the backbone layer 4012; and the feature pyramid module 402 then performs feature fusion on the upsampled temporary feature tensor 404-2 and the output tensor of the convolution layer of the backbone layer 4012 through the fusion module 403-2 to obtain the temporary feature tensor 404-1 (the dimension is 16×16×256, and the size is 16) with the same size as the output tensor of the convolution layer of the backbone layer 4012.

Figure 5:
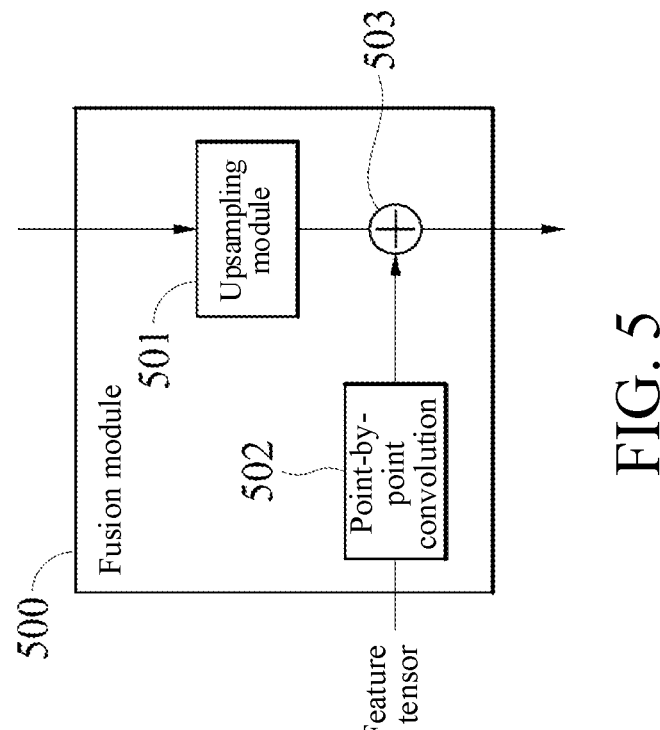
FIG. 5 is a fusion module block diagram according to some embodiments of the present disclosure.

FIG. 5 is a fusion module block diagram according to some embodiments of the present disclosure. In some embodiments of the present disclosure, the structures of the fusion module 403-1 and the fusion module 403-2 are shown as a fusion module 500, and the fusion module 500 includes an upsampling module 501, a point-by-point convolution layer 502 and a point-by-point addition module 503. The upsampling module 501 is configured to perform upsampling operation on the input of the upsampling module 501. In the aforementioned embodiments, the upsampling operation is to duplicate elements twice in the height axis and width axis directions of the input of the upsampling module 501 to convert the size of the input of the upsampling module 501 to be twice the original size. The point-by-point convolution layer 502 performs point-by-point convolution operation. The performing the point-by-point convolution operation is to perform convolution operation on the tensor by a convolution kernel having a dimension of 1×1×C, and C is the number of channels of the input of the point-by-point convolution layer 502. The point-by-point addition module 503 is configured to perform point-by-point addition operation on two received input tensors to obtain an output tensor of the point-by-point addition module 503. It is to be noted that the upsampling operation adopted in the aforementioned embodiments is an upsampling implementation, the upsampling module 501 may adopt other upsampling methods. This is not limited in the present disclosure.

Figures 1, 6:
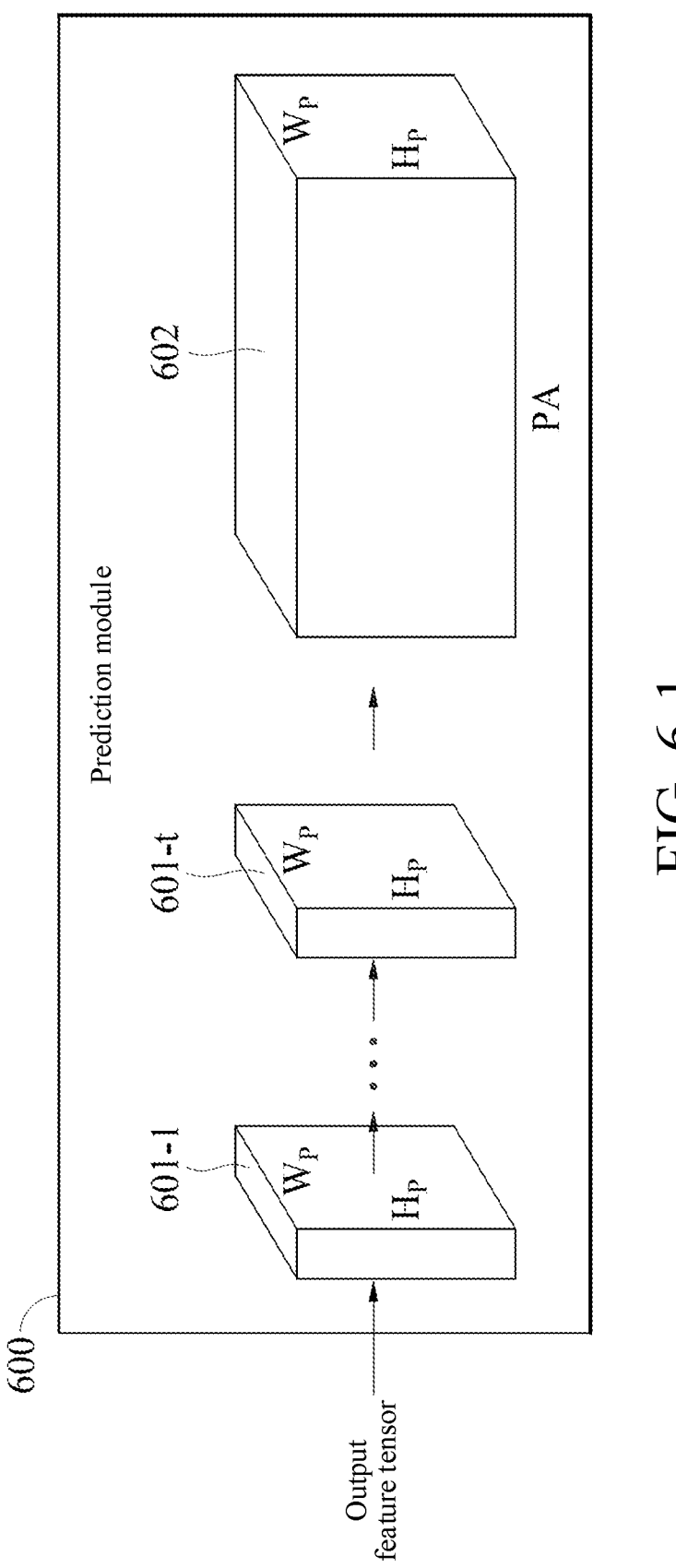
Figures 2, 6:
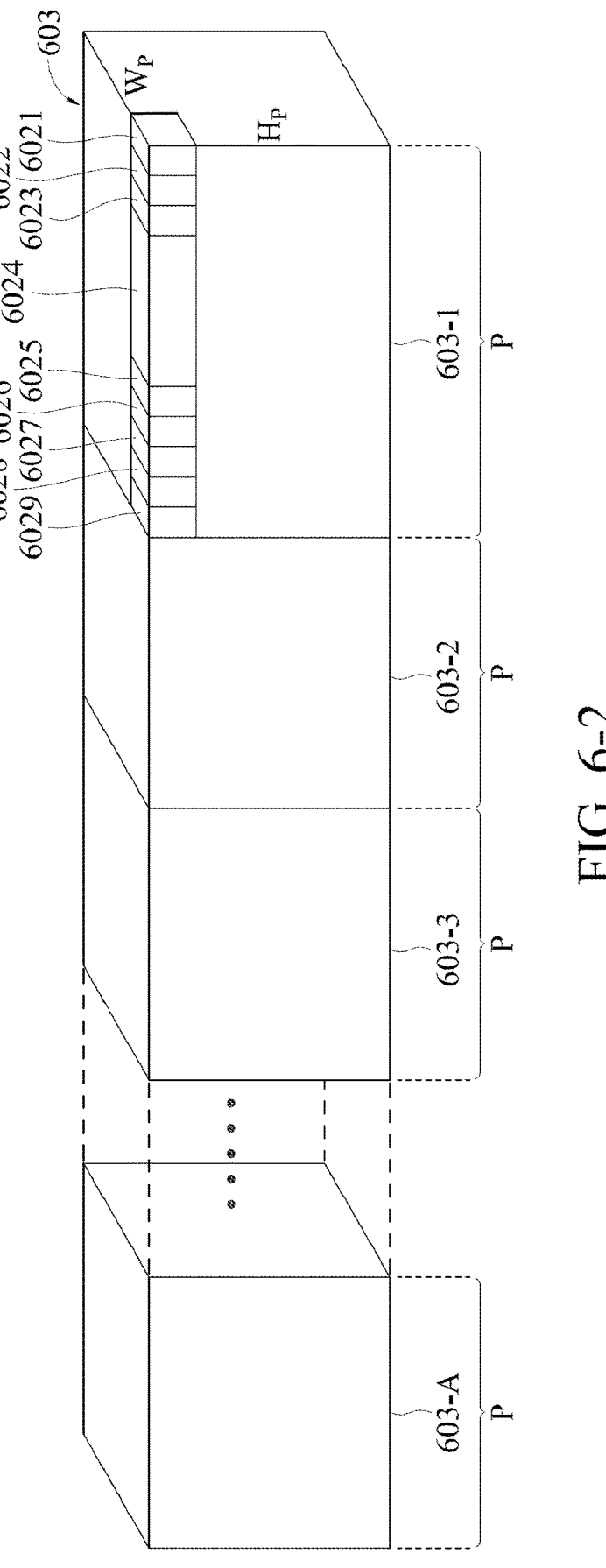

FIG. 6-1 is a prediction module schematic structural diagram according to some embodiments of the present disclosure. FIG. 6-2 is an information tensor schematic structural diagram according to some embodiments of the present disclosure. Refer to FIG. 6-1 and FIG. 6-2 together, in this embodiment, the structures of the prediction module 302-1 to the prediction module 302-3 are shown as a prediction module 600. The prediction module 600 is configured to include t convolution layers of $W_p \times H_p \times 128$: convolution layers 601-1 to 601-t, and a convolution layer of $W_p \times H_p \times PA$: a convolution layer 602, where it is a positive integer and represents the number of the convolution layers 601-1 to 601-t; $W_p$ and $H_p$ are positive integers and represent the dimensions of width axes and height axes of the convolution layers 601-1 to 601-t; A is a positive integer and represents the number of anchors; and P is a positive integer. It is to be noted that the convolution layer of $W_p \times H_p \times 128$ represents that the convolution layer performs convolution operation on the input tensor by 128 convolution kernels, and the tensor obtained by performing convolution operation on the input tensor by the 128 convolution kernels is subjected to concatenate in sequence to obtain an output tensor with the width axis number of $W_p$, the height axis number of $H_p$ and the channel number of 128 of a channel axis, and the output tensor is a tensor having a dimension of $W_p \times H_p \times 128$. Similarly, the convolution layer of $W_p \times H_p \times PA$ represents that the convolution layer performs convolution operation on the input tensor by PA convolution kernels, and the tensor obtained by performing convolution operation on the input tensor by the PA convolution kernels is subjected to concatenate in sequence to obtain an output tensor with the width axis number of $W_p$, the height axis number of $H_p$ and the channel number of PA of the channel axis.

The neural network module 300 is provided with A anchors with different sizes on the plurality of output feature tensors. In this embodiment, the value of P is 4+1+ the number of categories to which the face of the image 104 may belong +3, where 4 represents the number of tensor elements required for describing the position coordinate of a vertex of the anchor and detecting the width and the height; 1 represents the number of tensor elements required for describing the possibility that there is a target in the anchor and the accuracy of the anchor; and 3 represents the number of tensor elements required for describing the first angle, the second angle and the third angle of the face. The numerical values of $W_p$, $H_p$, P, A and t can be set by the user according to requirements. This is not limited in the present disclosure. It is to be noted that the output feature tensors received by the prediction modules 302-1 to 302-M are different in size, so that the numerical values of $W_p$ and $H_p$ of the prediction module 302-1 to the prediction module 302-3 are different.

The prediction module 600 is configured to receive any one of the plurality of output feature tensors, and when the output feature tensors pass through a convolution layer 601-1 to a convolution layer 601-t and a convolution layer 602 of the category prediction module 600, an information tensor 603 can be obtained. The information tensor 603 includes sub-information tensors 603-1, 603-2 to 603-A, and each of the sub-information tensors 603-1, 603-2 to 603-A corresponds to one anchor in the aforementioned anchors. Each of the sub-information tensors 603-1, 603-2 to 603-A includes $W_p \cdot H_p$ P-dimensional vectors. As shown in FIG. 6-2, each P-dimensional vector includes a tensor element 6021 to a tensor element 6029. The tensor element 6021 indicates the numerical value of the first angle of the face, the tensor element 6022 indicates the numerical value of the second angle of the face, and the tensor element 6023 indicates the numerical value of the third angle of the face. The tensor element 6024 includes a plurality of sub-tensor elements. Each of the plurality of sub-tensor elements of the tensor element 6024 indicates the probability that an object in the anchor belongs to each category. The tensor element 6025 indicates a confidence score. The confidence score indicates the possibility that there is a target in the anchor and the accuracy of the anchor. The tensor element 6026 indicates the height of the anchor. The tensor element 6027 indicates the width of the anchor. The tensor element 6028 and the tensor element 6029 indicate coordinates of the anchor. The numerical value of the first angle, the numerical value of the second angle and the numerical value of the third angle are angle information of the face. The coordinates of the anchor, the height of the anchor and the width of the anchor are position information of the face. The probability that the object in the anchor belongs to each category is the category information. The confidence score is the confidence score information.

The angle acquisition module 101 integrates all information tensors generated by each of the prediction modules 302-1 to 302-M to obtain the first angle, the second angle and the third angle of a face, and then the angle acquisition module 101 outputs the obtained first angle, second angle and third angle of the face.

It is to be noted that the angle acquisition module 101 integrates all information tensors generated by each of the prediction modules 302-1 to 302-M, and can also obtain the position and the category of the face.

It is to be noted that in this embodiment, although the content indicated by each tensor element of the P-dimensional vector is arranged as the above, the arrangement sequence of the content indicated by each tensor element of the P-dimensional vector is not limited by the above embodiments.

It is to be noted that when training the neural network module 300 in the embodiments as shown in FIG. 6-1 and FIG. 6-2, the trained neural network module 300 can be obtained by only adding data of the first angle, the second angle and the third angle in a training set and then training by a training method of an object detection model. It is to be noted that in the training process, when a prediction matches a face ground truth, the matched face angle is trained, and for labeling the face angle, a model for angle prediction is used for pseudo-labeling. Aiming at a prediction with very high probability but no face matched, the training target of the face angle is 90° or −90° (or positive/negative $$\frac{\pi}{2}$$

In embodiments as shown in FIG. 6-1 and FIG. 6-2, the neural network module 300 can simultaneously obtain the position and the category of the object (the face in the above embodiments) based on all information tensors generated by each of the prediction modules 302-1 to 302-M. That is, one neural network can simultaneously detect the position of the object and identify the object, and this framework and the method are referred to as one-stage object detection. The prediction module 302-1 to the prediction module 302-M are referred to as network head in the technical field of the present disclosure. The prediction module 302-1 to the prediction module 302-M disclosed by the above embodiments can replace the network head of other one-stage object detection models, so that the one-stage object detection models can output the first angle, the second angle and the third angle of the face. The present disclosure is not limited to the backbone module 401 and the feature pyramid module 402.

In the above embodiments, the prediction module 302-1 to the prediction module 302-M are used to perform one-stage face detection and angle identification by the framework of the prediction module 600, and a good use effect can be achieved even under the limitation of embedded system resources. In addition, by using the one-stage framework of the prediction module 302-1 to the prediction module 302-M, the range and the angle of a large number of faces can be provided in real time, without slowing down with the number.

Figure 7:
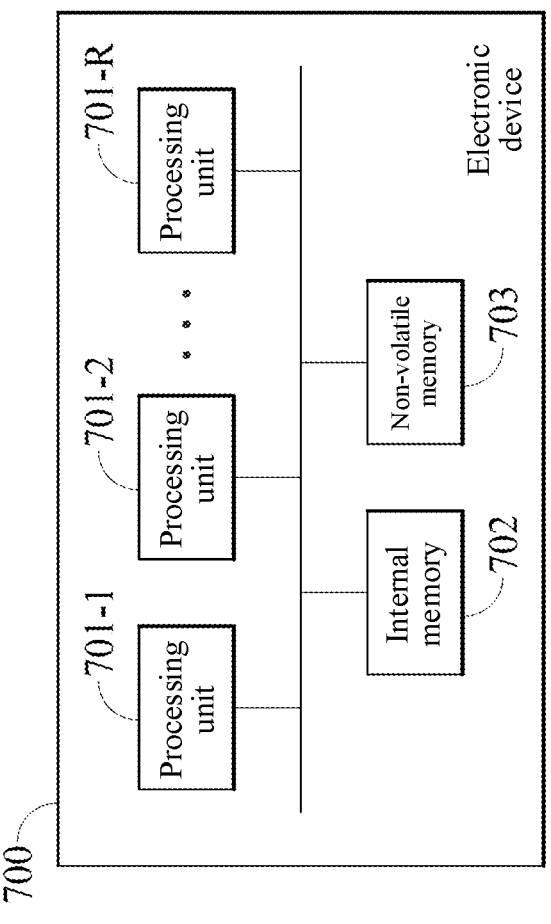
FIG. 7 is a schematic structural diagram of an electronic device according to some embodiments of the present disclosure.

FIG. 7 is a schematic structural diagram of an electronic device according to some embodiments of the present disclosure. As shown in FIG. 7, on a hardware level, the electronic device 700 includes processors 701-1, 701-2 to 701-R, an internal memory 702 and a non-volatile memory 703, where R is a positive integer. The internal memory 702 is, for example, a Random-Access Memory (RAM). The non-volatile memory 703 is, for example, at least one disk memory and the like. Of course, the electronic device 700 may further include hardware required for other functions.

The internal memory 702 and the non-volatile memory 703 are configured to store programs, where the programs can include program codes, and the program codes include computer operation instructions. The internal memory 702 and the non-volatile memory 703 provide instructions and data for the processors 701-1 to 701-R. The processors 701-1 to 701-R read corresponding computer programs from the non-volatile memory 703 into the internal memory 702 and then run the programs, the detection system 100 is formed on a logic level, and the processors 701-1 to 701-R are specifically configured to execute steps recorded in FIG. 8 to FIG. 12. Of course, the modules of the detection system 100 may alternatively be implemented as hardware. This is not limited in the present disclosure.

The processors 701-1 to 701-R may be integrated circuit chips and have signal processing capability. During implementation, the methods and steps disclosed in the above embodiments can be completed through hard integrated logic circuits or soft instructions in the processors 701-1 to 701-R. The processors 701-1 to 701-R may be universal processors, including a Central Processing Unit (CPU), a Tensor Processing Unit (TPU), a Digital Signal Processor (DSP), an Application Specific Integrated Circuit (ASIC), a Field-Programmable Gate Array (FPGA) or other Programmable logic devices. The methods and steps disclosed in the above embodiments can be implemented or executed.

In some embodiments of the present disclosure, a computer readable storage medium is also provided. The computer readable storage medium stores at least one instruction. When the at least one instruction is executed by the processors 701-1 to 701-R of the electronic device 700, the processors 701-1 to 701-R of the electronic device 700 can execute the methods and steps disclosed in the above embodiments.

Examples of the computer storage medium include, but are not limited to, phase change random access memories (PRAM), static random access memories (SRAM), dynamic random access memories (DRAM), other types of random access memories (RAM), read-only memories (ROM), electrically erasable programmable read-only memories (EEPROM), flash memories or other internal memory technologies, read-only optical disc read-only memories (CD-ROM), digital versatile discs (DVD) or other optical memories, magnetic tape cassettes, magnetic tape disk memories or other magnetic storage devices or any other non-transmission media, and can be configured to store information which can be accessed by computing devices. According to the definition in the present disclosure, the computer readable medium does not include transitory media, such as modulated data signals and carriers.

Based on the above, the detection system and the detection method provided by some embodiments of the present disclosure can quickly obtain the confidence value of the detected face as the front face by performing simple algebraic operation on the first angle, the second angle and the third angle of the detected face. According to the detection system and the detection method provided by some embodiments of the present disclosure, the prediction module 302-1 to the prediction module 302-M are used for one-stage face detection and angle identification by the framework of the prediction module 600, so that a good use effect can be achieved even under the limitation of embedded system resources. In addition, by using the one-stage framework of the prediction module 302-1 to the prediction module 302-M, the range and the angle of a large number of faces can be provided in real time, without slowing down with the number.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A detection system, comprising a processor and a memory storing instructions that, when executed by the processor, cause the processor to:

receive an image containing a face;

obtain a first angle and a second angle of the face based on the image;

obtain a first projection value and a second projection value based on the first angle and the second angle; and perform an exponentiation calculation by raising the first projection value to a power of the first correction value to obtain a third value;

perform an exponentiation calculation by raising the second projection value to a power of the second correction value to obtain a fourth value;

wherein the first correction value is obtained by multiplying a first preset parameter by 2, and the second correction value is obtained by multiplying a second preset parameter by 2; and obtain a confidence value which indicates whether the face in the image directly faces a camera based on the third value and the fourth value;

wherein the step of obtaining a confidence value based on the third value and the fourth value comprises calculating a difference value between 1 and a square root of a sum of the third value and the fourth value to obtain the confidence value.

2. The detection system according to claim 1, wherein the first angle is a yaw angle of the face and the second angle is a pitch angle of the face.

3. The detection system according to claim 2, wherein the first projection value is set as a sine function value of the first angle, and the second projection value is set as a negative number obtained by multiplying a cosine function value of the first angle by the sine function value of the second angle.

4. The detection system according to claim 1, wherein the instructions, when executed by the processor, cause the processor to implement a neural network module to receive the image containing the face and output the first angle and the second angle of the face.

5. The detection system according to claim 4, wherein the neural network module comprises an output feature tensor generation module and a plurality of prediction modules; the output feature tensor generation module is configured to generate a plurality of output feature tensors of different sizes based on the image containing the face; each of the prediction modules is configured to receive one of the output feature tensors to correspondingly generate an information tensor; the information tensor is configured to indicate position information, confidence score information, category information and angle information of the face; and the first angle and the second angle of the face is obtained based on all the information tensors generated by each of the prediction modules.

6. The detection system according to claim 5, wherein each of the prediction modules comprises a plurality of convolution layers; and each of the prediction modules is configured to perform convolution operation on one of the received output feature tensors based on respective convolution layers so as to generate the information tensor.

7. The detection system according to claim 5, wherein the output feature tensor generation module comprises:

a backbone module comprising a plurality of backbone layers with different sizes and configured to generate a plurality of feature tensors with different sizes and a first sequence based on the image containing the face through the backbone layers, the first sequence being an arrangement sequence of the feature tensors from large to small according to the sizes; and a feature pyramid module configured to carry out feature fusion on the feature tensors to obtain the output feature tensors.

8. A detection method, applicable to a detection system comprising an angle acquisition module, a projection calculation module and a confidence calculation module, comprising the following steps:

(a) receiving an image containing a face by the angle acquisition module and obtaining a first angle and a second angle of the face based on the image;

(b) obtaining a first projection value and a second projection value by the projection calculation module based on the first angle and the second angle; and (c) performing by the confidence calculation module:

performing an exponentiation calculation on the first projection value raising the first projection value to a power of the first correction value to obtain a third value, performing an exponentiation calculation on the second projection value by raising the second projection value to a power of the second correction value to obtain a fourth value;

wherein the first correction value is obtained by multiplying a first preset parameter by 2, and the second correction value is obtained by multiplying a second preset parameter by 2; and obtaining a confidence value which indicates whether the face in the image directly faces a camera based on the third value and the fourth value;

wherein the step of obtaining a confidence value based on the third value and the fourth value comprises calculating a difference value between 1 and a square root of a sum of the third value and the fourth value to obtain the confidence value.

9. The detection method according to claim 8, wherein the first angle is a yaw angle of the face and the second angle is a pitch angle of the face of the face.

10. The detection method according to claim 9, wherein the step (b) comprises: setting the first projection value as a sine function value of the first angle, and setting the second projection value as a negative number obtained by multiplying the cosine function value of the first angle by the sine function value of the second angle.

11. The detection method according to claim 8, wherein the angle acquisition module comprises a neural network module; and the step (a) comprises:

(a1) receiving the image containing the face and output the first angle and the second angle.

12. The detection method according to claim 11, wherein the neural network module comprises an output feature tensor generation module and a plurality of prediction modules; and the step (a1) comprises:

(a11) generating a plurality of output feature tensors of different sizes by the output feature tensor generation module based on the image containing the face;

(a12) receiving one of the output feature tensors to correspondingly generate an information tensor by each of the prediction modules, the information tensor indicating position information, confidence score information, category information and angle information of the face; and (a13) outputting the first angle and the second angle of the face by the angle acquisition module based on all the information tensors generated by each of the prediction modules.

13. The detection method according to claim 12, wherein each of the prediction modules comprises a plurality of convolution layers; and the step (a12) comprises:

performing convolution operation on one of the received output feature tensors by each of the prediction modules based on respective convolution layers so as to generate an information tensor.

14. The detection method according to claim 12, wherein the output feature tensor generation module comprises a backbone module and a feature pyramid module; the backbone module comprises a plurality of backbone layers with different sizes; and the step (a11) comprises:

(a111) generating a plurality of feature tensors with different sizes and a first sequence based on the image containing the face by the backbone module through the backbone layers, the first sequence being an arrangement sequence of the feature tensors from large to small according to the sizes; and (a112) carrying out feature fusion on the feature tensors by the feature pyramid module to obtain the output feature tensor.

\* \* \* \* \*